United States Patent Office 2,908,453
Patented Oct. 13, 1959

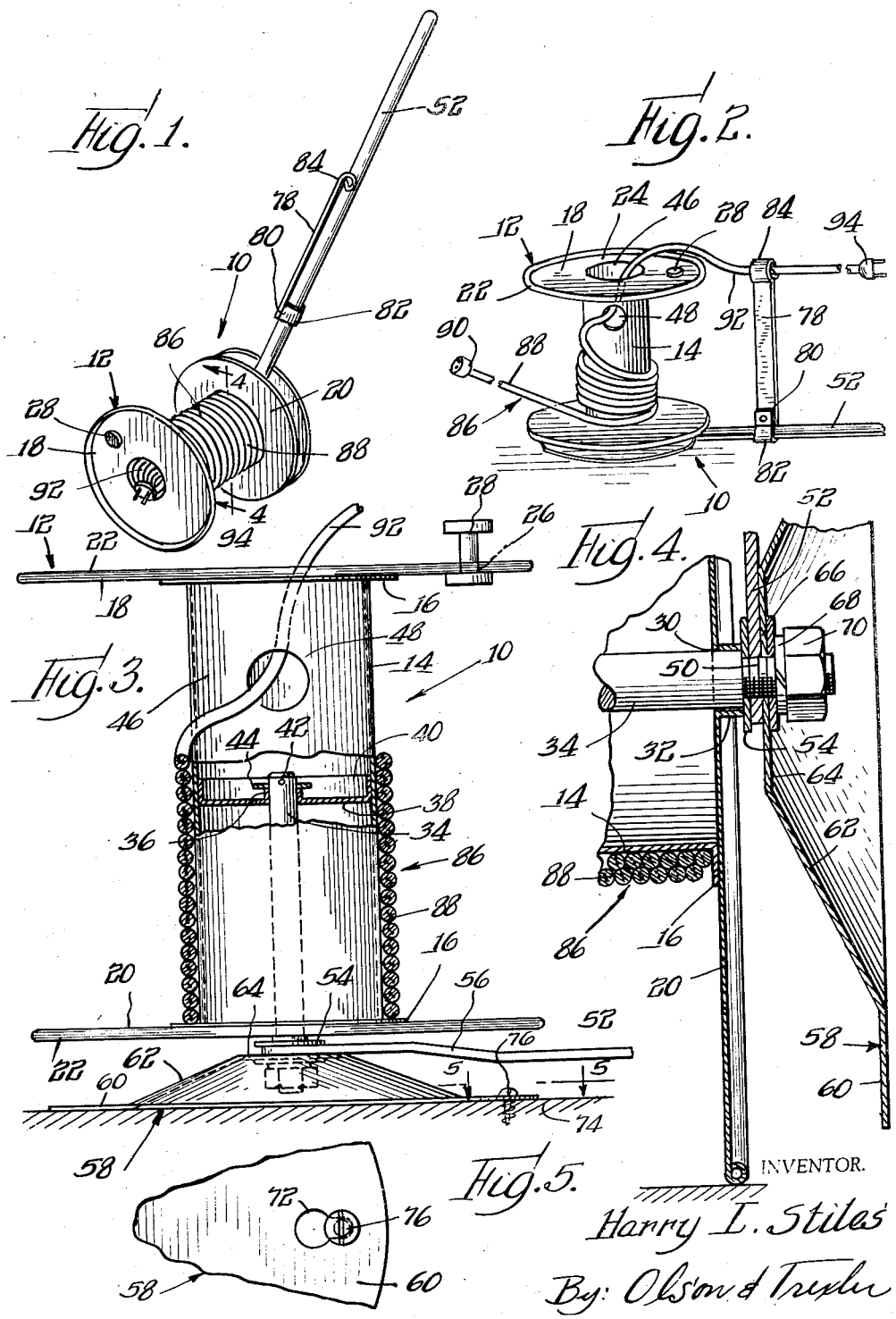

2,908,453

CORD REEL DEVICE

Harry L. Stiles, Cedar Grove, N.J., assignor to The Silex Company, Hartford, Conn., a corporation of Connecticut Application December 24, 1956, Serial No. 630,111

2 Claims. (Cl. 242—94)

This invention is concerned generally with electrical extension cords and the like, and more particularly with a cord reel device for storing such an extension cord.

Portable electrical yard and lawn tools are being used with ever increasing frequency. Electric lawn mowers, lawn edgers or trimmers, and hedge clippers are now familiar to almost everyone. These devices are of a relatively uncomplicated nature, and are simple and economical to operate. However, they do present a problem in that they sometimes must be used at distances of 50 to 100 feet or even more from the nearest electrical outlet. Generally speaking, it is impractical and undesirable to provide an electrical tool or appliance with a drop cord of great length, inasmuch as it will not be needed at all times. Accordingly, it is common practice to use extension cords for this purpose. The frequently rather extensive length of such cords requires that they be folded or rolled up in some manner for storage, and it will be obvious that such folding or rolling for storage, and the reverse operation for utilizing the extension cord, must be simple and quick.

Accordingly, it is an object of this invention to provide a cord reel device for storing extension cords, which device is of simple, economical, and substantially fool-proof construction, and which can be expected to have a long service life.

Furthermore, it is an object of this invention to provide a cord reel device which readily is rolled from one spot to another, thereby obviating the user of the necessity of carrying any substantial weight from place to place.

Another object of this invention is to provide a cord reel device in which the major portion of an extension cord is wound on the outside of a reel for ready access, and wherein a relatively short length of extension cord is housed within the reel for plugging into a convenient outlet.

Yet another object of this invention is to provide a cord reel device having a base for supporting the reel in upright position for ready reeling or unreeling of an extension cord on the reel.

Other and further objects and advantages of the present invention will be apparent from the following description when taken in connection with the accompanying drawings, wherein:

Fig. 1 is a perspective view of a cord reel device constructed in accordance with the principles of the present invention;

Fig. 2 is a fragmentary view of the cord reel device in position for extension;

Fig. 3 is a view generally similar to Fig. 2, but in part in longitudinal section;

Fig. 4 is an enlarged fragmentary longitudinal sectional view showing certain details of construction; and Fig. 5 is a fragmentary view of a portion of the base as taken substantially along the line 5—5 in Fig. 3.

Referring now in greater particularity to the drawings, a cord reel device 10 constructed in accordance with the principles of this invention will be seen to include a reel or spool 12. The reel or spool 12 will be seen to comprise a central sheet metal body, or cylinder 14 having outwardly directed circumferential flanges 16 at the opposite ends thereof. These flanges are spot welded to end disks 18 and 20, having rolled over edges 22 for strength and rigidity. The upper end disk 18 (as viewed in Figs. 2 and 3) is provided with a central aperture 24 of substantially the same diameter as the interior of the body or cylinder 14. The end disk 18 also is provided near its periphery with an aperture 26 in which there is mounted a spool-like winding or take up knob 28 having a cylindrical body portion with enlarged heads on the opposite ends thereof.

The opposite end disk 20, as may be seen most particularly in Fig. 4, is provided with a small central aperture 30 having a cylindrical neck 32 extending outwardly therefrom and forming a bearing for a stud or axle 34. The opposite end of the stud or axle 34 extends slightly beyond the mid-line of the body or cylinder 14, and is journalled in the axially extending neck 36 of a spacer disk or plate 38 having an axially directed circumferential flange 40 fitting within, and preferably spot welded to the cylinder 14. A cotter pin 42 extends through this end of the stud or axle 34, and a steel washer 44 is interposed between the neck 36 and the cotter pin 42.

It will be observed that the upper portion of the cylinder 14 (as viewed in Figs. 2 and 4) comprises a compartment 46 open at the top through the aperture or hole 24. A lateral aperture 48 also is provided through the sidewall of the cylinder 14.

The end of the stud or axle 34 adjacent the disk 20 is reduced in diameter as at 50, the reduced diameter portion being threaded. The lower end of an elongated handle 52 is apertured, and is received on the reduced end portion 50, a steel washer 54 being interposed between the handle and the neck 32. The handle can be of flat stock as shown, or can be of tubular stock with the lower end flattened. In any event, the handle extends radially from the axle 34, and is of such length that it can be conveniently grasped by a normal adult with the handle in inclined or oblique position, and the reel resting on the rolled edges 22 of the disks 18 and 20, as in Fig. 1. It will be observed that the handle is offset slightly at 56 to preclude interference with the reel, and with the cord wound thereon as hereinafter will be set forth.

The cord reel device also is provided with a dished base or support 58. This base or support has a circumferential flat ring 60 joined by a frusto-conical section 62 to a central flat disk portion 64. The central disk portion 64 is centrally apertured, and is fitted over the threaded reduced end 50, in abutting relation with the lower end of the handle 52. A steel washer 66 bears against the outer or under surface of the base central disk 64, and a lock washer 68 is held against the washer 66 by a nut 70 threaded on the end of the reduced portion of the stud or axle 34. It will be observed that the outer ring 60 of the base 58 is provided with a plurality, preferably three, of key hole slots 72, and shown specifically in Fig. 5. By this means, the base can be anchored firmly, but detachably to a floor 74 or the like by means of screws 76. Furthermore, as readily will be understood, the key hole slots could be used for hanging the device on a wall for storage.

The device is completed by an arm 78 pivotally connected at 80 to a bracket 82 secured on the handle 52 adjacent the lower end thereof. The free or outer end of the arm 78 is provided with a loop or eye 84. The loop or eye is not quite closed, so that a cord can be moved laterally thereinto, and the pivot connection of the arm preferably comprises cooperating detent or dimple devices or the like for more or less firmly holding the arm either in parallelism with the handle as shown in Fig. 1, or at right angles thereto as shown in Fig. 2. Such devices or mechanisms are not specifically shown since they are well known in the art.

An extension cord generally designated by the numeral 86, and of substantial length, is associated with the cord reel device 10. More specifically, the greater length of the extension cord 86, as is indicated at 88, alternatively is wound on the outside of the body or cylinder 14, or, extends thereaway from. A female socket or receptacle 90 is provided at the end of the long portion 88 for receipt of the male plug of a tool or appliance. The extension cord 86 extends through the aperture 48 into the compartment 46, and a relatively short length 92 of the extension cord is tightly coiled for storage within the compartment, as shown in Fig. 1, or extends therefrom as in Figs. 2 and 3. The end of the relatively short length 92 is provided with a male plug 94 for detachable association with the usual convenience outlet. Preferably, the short length 92 of the extension cord is slipped laterally into the loop or eye 84 of the arm 78 with the arm in the extended or right angle position as shown in Fig. 2. This prevents the short length from providing any strain on the cord reel device such as might tend to tip it over.

With both lengths 88 and 92 of the extension cord 86 wound in storage position as shown in Fig. 1, the device readily can be rolled from one site to another simply by grasping the handle 52 in the hand, and walking along. When the cord reel device has been taken to the desired site, it is upended so as to rest on the base 58 as in Fig. 3. The long end 88 of the cord then is pulled toward the position at which it is desired to operate the tool or appliance. In instances in which the base cannot be held down, as by the screws 76, it will be understood that it is preferable to pull the cord in the direction of the handle 52, the handle thereby serving as a brace or support positively preventing tipping of the cord reel device. The short length 92 then is pulled from the compartment 46, and preferably is slipped into the eye 84 before the male plug 74 is inserted in the convenience outlet. It will be understood that the short length of cord could be associated with the eye before unreeling of the long length, if desired, in which case the short length would simply rotate substantially about its own axis during rotation of the reel 12. The arm 78 and eye 84 prevent the relatively short length of cord 92 from imposing any tipping force on the device.

To reel up the extension cord, the plug 94 is unplugged, and preferably the plug and cord length 92 are coiled into the compartment 46.

The knob 28 then is raised from its normal, out-of-the-way position to that of Fig. 3, and the reel is rotated by the knob to wind up the length 88.

It will be understood that the specific example of the invention as herein shown and described is for illustrative purposes only. Various changes in structure will no doubt occur to those skilled in the art, and will be understood as forming a part of this invention insofar as they fall within the spirit and scope of the appended claims.

The invention is claimed as follows:

1. A cord reel device for extension cords and the like comprising a cylindrical body having radially extending peripheral flanges substantially at the opposite ends thereof and defining an area on which an extension cord may be wound, a handle rotatably associated with said body and a flange at one end thereof, said handle extending substantially radially from said body and flanges whereby the handle may be grasped by the hand for rolling the flanges along a supporting surface, a base at the same end of said body as the handle, said base being rotatable relative to said body whereby said base may support said body in upright position for rotation of said body to wind an extension cord thereon, or to unwind an extension cord therefrom, means supporting a bearing along the axis of said body substantially midway between the ends thereof, and an axle rotatably supported in said bearing and at the end of said body adjacent the handle and base, said handle and said base being affixed to said axle, the means supporting the bearing substantially midway between the ends of the body comprising a partition defining with the body a compartment open at one end to substantially the full diameter of the body, the body having an aperture therein communicating with said compartment whereby part of an extension cord wound on said body may extend into said body for storage in said compartment.

2. A cord reel device for extension cords and the like comprising a cylindrical body having radially extending peripheral flanges substantially at the opposite ends thereof and defining an area on which an extension cord may be wound externally of said body, said cylindrical body defining a compartment open at one end to substantially the full diameter of said compartment, said cylindrical body having an aperture therein whereby part of an extension cord wound on said body may extend into said body for storage in said compartment, a handle rotatably connected to said body and the flange at one end thereof, said handle being positioned at said one end and extending radially from said body and flange a substantial distance whereby it may be grasped in the hand for rolling the flanges along a supporting surface, a base mounted in association with said handle at one end of said body and flanges, said base comprising a sheet material member having an outer, substantially flat ring providing a substantially circumferentially contiguous planar surface adapted to rest on a supporting surface and a central, substantially flat disk joined to said ring by a frusto-conical section; said ring having keyhole-shaped slots therein, and said body and flanges being rotatable relative to said base whereby said base may hold the body in upright position for rotation thereof upon reeling or unreeling an extension cord on said body.

References Cited in the file of this patent

UNITED STATES PATENTS

| | | |
|---|---|---|
| 815,830 | Hopkins | Mar. 20, 1906 |
| 1,604,304 | Perkanis | Oct. 26, 1926 |
| 2,140,676 | Hohner | Dec. 20, 1938 |
| 2,540,434 | Fengler | Feb. 6, 1951 |
| 2,757,404 | Kelly | Aug. 7, 1956 |
| 2,805,290 | Wentsel | Sept. 3, 1957 |